United States Patent
Wang et al.

(10) Patent No.: US 10,482,093 B2
(45) Date of Patent: Nov. 19, 2019

(54) DATA MINING METHOD

(71) Applicant: CHINA UNIONPAY CO., LTD., Shanghai (CN)

(72) Inventors: Jun Wang, Shanghai (CN); Hongchao Yang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 207 days.

(21) Appl. No.: 15/100,533

(22) PCT Filed: Dec. 10, 2014

(86) PCT No.: PCT/CN2014/093430
§ 371 (c)(1),
(2) Date: May 31, 2016

(87) PCT Pub. No.: WO2015/085916
PCT Pub. Date: Jun. 18, 2015

(65) Prior Publication Data
US 2016/0314174 A1 Oct. 27, 2016

(30) Foreign Application Priority Data
Dec. 10, 2013 (CN) .......................... 2013 1 0665357

(51) Int. Cl.
G06F 16/2458 (2019.01)
G06F 16/28 (2019.01)
G06K 9/62 (2006.01)

(52) U.S. Cl.
CPC ...... *G06F 16/2465* (2019.01); *G06F 16/2462* (2019.01); *G06F 16/285* (2019.01);
(Continued)

(58) Field of Classification Search
CPC ......... G06F 17/30539; G06F 17/30536; G06F 17/30598; G06F 16/2465; G06F 16/285;
(Continued)

(56) References Cited

U.S. PATENT DOCUMENTS 6,016,394 A * 1/2000 Walker ...................... G06F 8/30
717/104
2002/0169735 A1* 11/2002 Kil ..................... G06F 17/30539
706/46
(Continued)

FOREIGN PATENT DOCUMENTS

| CN | 101227435 A | 7/2008 |
| CN | 101477544 A | 7/2009 |
| CN | 10317698 A | 6/2013 |

OTHER PUBLICATIONS

Christopher D. manning et al: "An introduction to Information Retrieval (Cahpter 13)", Online edition (c) 2009 Cambridge UP, Apr. 1, 2009 (Apr. 1, 2009), pp. 253-287, XP055389569, Retrieved from the Internet: URL:https://nlp.stanford.edu?IR-boo/pdf/13bayes.pdf [retrieved on Jul. 10, 2017] pp. 256, 258-261, 271 and 277 *example 13.1; table 13.1*.
(Continued)

*Primary Examiner* — James Trujillo
*Assistant Examiner* — Jessica N Le
(74) *Attorney, Agent, or Firm* — The Ollila Law Group LLC

(57) ABSTRACT

The present invention proposes a method for data mining, the method comprising: making statistics of the feature vectors of each target object according to the records in a target data set so as to constitute a rough data set, each of the feature vectors including the value of at least one attribute data of the target objects corresponding thereto; screening the feature vectors which correspond to all known the first type of target objects from the rough data set, and performing a filter operation onto the screened feature vectors to obtain samples; and building a regression model based on the samples, and then using the built regression model to determine whether each of all known the second type of target objects potentially belongs to the first type of target (Continued)

objects. The method for data mining disclosed in the present invention is capable of mining and classifying the target objects according to the comprehensive features of the target objects.

6 Claims, 1 Drawing Sheet

(52) U.S. Cl.
CPC ......... *G06K 9/6267* (2013.01); *G06K 9/6278* (2013.01); *G06K 9/6284* (2013.01)
(58) Field of Classification Search
CPC ............. G06F 16/2462; G06F 16/6267; G06F 16/6284; G06K 9/6267; G06K 9/6278; G06K 9/6284
USPC ........................................................ 707/737
See application file for complete search history.

(56) References Cited

U.S. PATENT DOCUMENTS

| | | | | |
|---|---|---|---|---|
| 2004/0267770 | A1* | 12/2004 | Lee | G06F 17/30539 |
| 2005/0238244 | A1* | 10/2005 | Uzawa | G06T 9/20 |
| | | | | 382/242 |
| 2006/0136462 | A1 | 6/2006 | Campos et al. | |
| 2008/0159614 | A1 | 7/2008 | He et al. | |
| 2012/0143808 | A1* | 6/2012 | Karins | G06N 7/005 |
| | | | | 706/46 |
| 2013/0031522 | A1* | 1/2013 | Robles | G06F 17/5081 |
| | | | | 716/112 |
| 2013/0060933 | A1* | 3/2013 | Tung | G06F 11/3495 |
| | | | | 709/224 |
| 2013/0198110 | A1* | 8/2013 | Sellers, Jr. | G06Q 40/06 |
| | | | | 705/36 R |
| 2013/0251246 | A1* | 9/2013 | Tang | G06K 9/6206 |
| | | | | 382/159 |
| 2014/0156565 | A1* | 6/2014 | Kolachina | G06F 17/18 |
| | | | | 706/12 |
| 2015/0339680 | A1* | 11/2015 | Takahashi | G06Q 30/02 |
| | | | | 705/7.29 |

OTHER PUBLICATIONS

Anonymous: "Logistic regression—Wikipedia, the free encyclopedia", Oct. 21, 2013 (Oct. 21, 2013), XP055389570, retrieved from the Internet: URL:https://web.archive.org/web/20131021001919/https://en.wikipedia.org/wiki/Logistic_regression [retrieved on Jul. 10, 2017 *the whole document*.

* cited by examiner

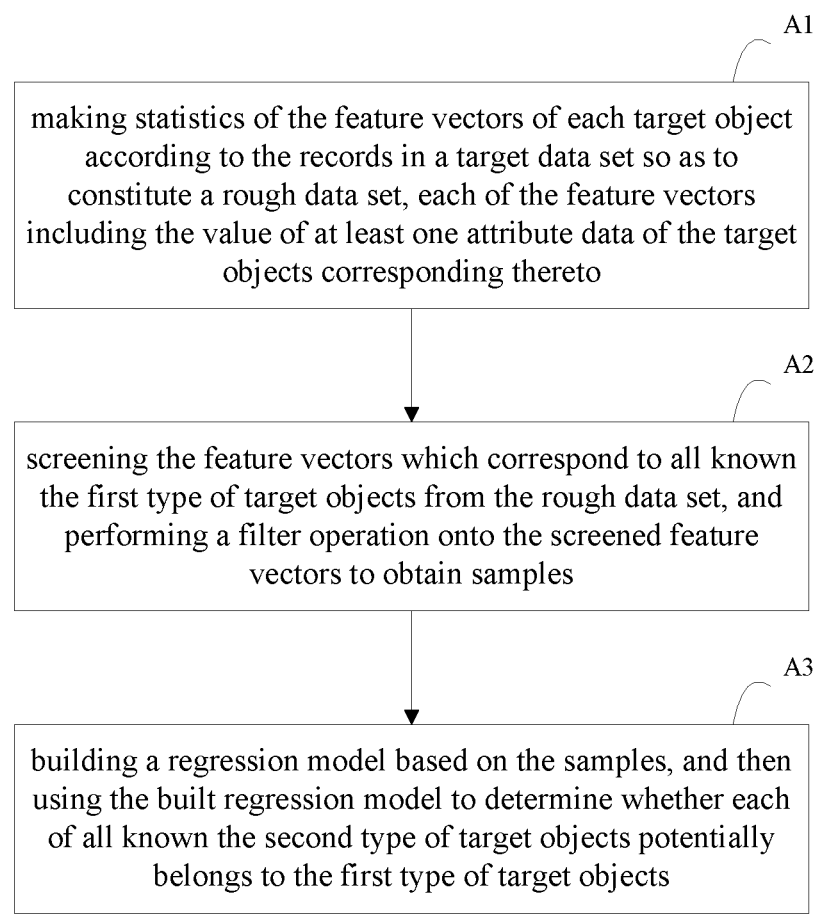

DATA MINING METHOD

TECHNICAL FIELD

The present invention relates to a method for data mining, more specifically to a method for data mining based on a regression model.

BACKGROUND

Currently, with the application of computer and network is increasingly widespread and business types of the different fields are increasingly enrich, effectively mining different categories of objects from records of massive data associated with a specific object in order to implement different process solutions for different categories of objects becomes more and more important.

In the existing technical solutions, the target objects are usually classified according to one or more attribute data associated with the target objects, i.e., the target objects are classified based on a value of certain or some specific attribute data of each target object.

However, the existing technical solutions have the following problems: since the target objects are classified merely based on a single or several attribute data, the accuracy of the classification result is low, and because the same assessment operation needs to be performed for attribute data of each target object, the data mining procedure is less efficient.

Therefore, there exists the following requirement: to provide a method for data mining based on a regression model which is capable of mining and classifying the target objects according to comprehensive features of the target objects.

SUMMARY

In order to solve the above problems existed in the existing technical solutions, the present invention provides a method for data mining based on a regression model which is capable of mining and classifying the target objects according to the comprehensive features of the target objects.

The purpose of the present invention is realized through the following technical solution:

A method for data mining comprising the following steps:
(A1) making statistics of the feature vectors of each target object according to the records in a target data set so as to constitute a rough data set, each of the feature vectors including the value of at least one attribute data of the target objects corresponding thereto;
(A2) screening the feature vectors which correspond to all known the first type of target objects from the rough data set, and performing a filter operation onto the screened feature vectors to obtain samples;
(A3) building a regression model based on the samples, and then using the built regression model to determine whether each of all known the second type of target objects potentially belongs to the first type of target objects.

In the solution disclosed above, preferably, the feature vectors included in the regression model comprise the values of attribute feature data which is common to all the first type of target objects.

In the solution disclosed above, preferably, the filter operation comprises filtering out the noise points from the screened feature vectors according to predetermined criteria.

In the solution disclosed above, preferably, the step (A3) further comprises extracting a first portion of the samples as training samples to build the regression model; extracting a second portion of the samples as testing samples to test the built regression model; extracting the third portion of the samples as application samples to test the stability of the built regression model.

In the solution disclosed above, preferably, the step (A3) further comprises performing a standardized operation onto each field in each sample prior to build the regression model, including: (1) handling the missing values; (2) handling singular values; (3) re-encoding the discrete character fields; and (4) standardizing each field in each sample in a z-score manner in order to eliminate the influence of dimension inconsistency.

In the solution disclosed above, preferably, the step (A3) further comprises further performing a discretization operation onto each field in each sample after the completion of performing the standardized operation, including: (1) discretizing continual data in a division interval manner, wherein a division point between intervals is the point causing the target variable to appear an obvious transition; (2) judging advantages and disadvantages of the interval division result according to the tendency of the WOE value curve, wherein if the WOE value curve has the tendency of increasing, decreasing, or existing only one transition point, then it is determined that the division result is excellent and then the discretization operation is terminated, otherwise returning to the step (1) to continue to perform the division in this interval.

In the solution disclosed above, preferably, the built regression model is used to determine whether each of all known the second type of target objects potentially belongs to the first type of target objects in the following manner: the probability of the known second type of target objects belonging to the first type of target objects is calculated for the feature vectors corresponding to the known second type of target objects based on the regression model, and if the calculated probability is greater than a predetermined classification threshold, then it is determined that the known second type of target objects potentially belong to the first type of target objects.

The method for data mining based on the regression model disclosed in the present invention has the following advantages: it is capable of mining and classifying the target objects according to comprehensive features of the target objects, and due to the use of the regression model to performing determination, the reusability is high and the efficiency and accuracy of determining operation can be significantly improved.

BRIEF DESCRIPTION OF THE DRAWINGS

The technical features and advantages of the present invention will be better understood by the ones skilled in the art in combination with the appended drawings, in which:

FIG. 1 is a flowchart of a method for data mining according to an embodiment of the present invention.

DETAILED DESCRIPTION

FIG. 1 is a flowchart of a method for data mining according to an embodiment of the present invention. As illustrated in FIG. 1, the method for data mining disclosed in the present invention comprises the following steps: (A1) making statistics of the feature vectors of each target object (e.g. a cardholder of a financial card) according to the records in a target data set (e.g. a transaction record set in the financial field) so as to constitute a rough data set, each of the feature vectors including the value of at least one attribute data (for example, the average monthly consumption amount, the average monthly transaction frequency, the number of cross-border transactions, abroad consumption amount, large scale transaction proportion, high-end card tag, or the like in the financial field) of the target objects corresponding thereto; (A2) screening the feature vectors which correspond to all known the first type of target objects (e.g. the high-end cardholders in the financial field, such as cardholders of platinum cards) from the rough data set, and performing a filter operation onto the screened feature vectors to obtain samples; (A3) building a regression model based on the samples, and then using the built regression model to determine whether each of all known the second type of target objects (e.g. non high-end cardholders in the financial field, such as cardholders of common cards) potentially belongs to the first type of target objects (e.g. mining potential high-end cardholders from the non high-end cardholders).

Preferably, in the method for data mining disclosed in the present invention, the feature vectors included in the regression model comprise the values of attribute feature data which is common to all the first type of target objects (i.e., the regression model includes the features which is common to all of the first type of target objects).

Preferably, in the method for data mining disclosed in the present invention, the filter operation comprises filtering out noise points from the screened feature vectors according to predetermined criteria (for example, for the information of high-end cardholders in the financial field, if the average monthly consumption quota is used as screening standard, then the process of filtering noise points is as follows: sorting the field, and filtering out the top 10% and bottom 10% of cardholder transaction information, because not all of the consumption records of high-end cards are of high-end consumption characteristics, and a small number of consumption records of high-end card are too high-end and lack universality).

Preferably, in the method for data mining disclosed in the present invention, the step (A3) further comprises extracting a first portion (e.g. 70%) of the samples as training samples to build the regression model; extracting a second portion (e.g. 20%) of the samples as testing samples to test the built regression model; extracting the third portion (e.g. 10%) of the samples as application samples to test the stability of the built regression model.

Preferably, in the method for data mining disclosed in the present invention, the step (A3) further comprises performing a standardized operation onto each field in each sample prior to build the regression model, including: (1) handling missing values (for example, if the numeric fields miss data, column mean values are used to fill them, if the character fields miss data, the sample is discarded); (2) handling singular values (for example, using boxed figure technology to filter out extreme abnormity point); (3) re-encoding the discrete character fields; and (4) standardizing each field in each sample in a z-score manner in order to eliminate the influence of dimension inconsistency.

Preferably, in the method for data mining disclosed in the present invention, the step (A3) further comprises further performing a discretization operation onto each field in each sample after the completion of performing the standardized operation, including: (1) discretizing continual data in a division interval manner, wherein a division point between intervals is the point causing the target variable to appear an obvious transition; (2) judging advantages and disadvantages of the interval division result according to the tendency of the WOE (weight of evidence) value curve, wherein if the WOE value curve has the tendency of increasing, decreasing, or existing only one transition point, then it is determined that the division result is excellent and then the discretization operation is terminated, otherwise returning to the step (1) to continue to perform the division in this interval.

Preferably, in the method for data mining disclosed in the present invention, the built regression model is used to determine whether each of all known the second type of target objects potentially belongs to the first type of target objects in the following manner: the probability of the known second type of target objects belonging to the first type of target objects is calculated for the feature vectors corresponding to the known second type of target objects based on the regression model, and if the calculated probability is greater than a predetermined classification threshold (e.g. 0.8), then it is determined that the known second type of target objects potentially belong to the first type of target objects (for example, in the financial field, it is determined that a certain user of ordinary cards is potential high-value cardholder).

It can be seen from the above, the method for data mining disclosed in the present invention has the following advantages: it is capable of mining and classifying the target objects according to the comprehensive features of the target objects, and due to the use of the regression model to performing determination, the reusability is high and the efficiency and accuracy of determining operation can be significantly improved.

Although the present invention is described by means of the above preferred embodiments, but its implementation is not limited to the above embodiments. It should be recognized that those skilled in the art could make various changes and modifications to the present invention without departing from the spirit and scope of the present invention.

The invention claimed is:

1. A method for data mining comprising the following steps:
   (A1) making statistics of feature vectors of each target object according to records in a target data set so as to constitute a rough data set, each of the feature vectors including a value of at least one attribute data of the target objects corresponding thereto;
   (A2) screening the feature vectors which correspond to all known first type of target objects from the rough data set, and performing a filter operation onto the screened feature vectors to obtain samples; and
   (A3) building a regression model based on the samples, and then using the built regression model to determine whether each of all known second type of target objects potentially belongs to the first type of target objects;
   wherein the step (A3) further comprises: performing a standardized operation onto each field in each sample prior to build the regression model, including: (A31) handling missing values; (A32) handling singular values; (A33) re-encoding discrete character fields; and (A34) standardizing each field in each sample in a z-score manner in order to eliminate an influence of dimension inconsistency;
   wherein the step (A3) further comprises further performing a discretization operation onto each field in each sample after completion of performing the standardized operation, including: (A35) discretizing continual data in a division interval manner, wherein a division point between intervals is the point causing the target variable to appear an obvious transition; (A36) judging advantages and disadvantages of an interval division result according to a tendency of a weight of evidence (WOE) value curve, wherein if the WOE value curve has the tendency of increasing, decreasing, or existing only one transition point, then it is determined that the division result is excellent and then the discretization operation is terminated, otherwise returning to the step (A35) to continue to perform the division in this interval.

2. The method for data mining of claim 1, wherein the feature vectors included in the regression model comprise the values of attribute feature data which is common to all of the first type of target objects.

3. The data mining method of claim 2, wherein the filter operation comprises filtering out noise points from the screened feature vectors according to a predetermined criteria.

4. The method for data mining of claim 3, wherein the step (A3) further comprises extracting a first portion of the samples as training samples to build the regression model; extracting a second portion of the samples as testing samples to test the built regression model; extracting a third portion of the samples as application samples to test the stability of the built regression model.

5. The method for data mining of claim 1, wherein the built regression model is used to determine whether each of all known the second type of target objects potentially belongs to the first type of target objects in the following manner: a probability of the known second type of target objects belonging to the first type of target objects is calculated for the feature vectors corresponding to the known second type of target objects based on the regression model, and if the calculated probability is greater than a predetermined classification threshold, then it is determined that the known second type of target objects potentially belong to the first type of target objects.

6. The method for data mining of claim 1, wherein the target data set is a transaction record set in financial field.

* * * * *